United States Patent
Osborne, Jr. et al.

(10) Patent No.: US 10,373,738 B2
(45) Date of Patent: Aug. 6, 2019

(54) INSULATED WIRE CONSTRUCTION WITH LINER

(71) Applicant: WIRE HOLDINGS, LLC, Cleveland, OH (US)

(72) Inventors: Jay Harold Osborne, Jr., Chardon, OH (US); Ronald B. Villanueva, Parma Hts., OH (US)

(73) Assignee: Radix Wire & Cable, LLC, Cleveland, OH (US)

( * ) Notice: Subject to any disclaimer, the term of this patent is extended or adjusted under 35 U.S.C. 154(b) by 401 days.

(21) Appl. No.: 15/149,389

(22) Filed: May 9, 2016

(65) Prior Publication Data

US 2016/0329129 A1   Nov. 10, 2016

Related U.S. Application Data

(60) Provisional application No. 62/158,809, filed on May 8, 2015.

(51) Int. Cl.
| | |
|---|---|
| *H01B 7/295* | (2006.01) |
| *H01B 7/28* | (2006.01) |
| *H01B 1/02* | (2006.01) |

(52) U.S. Cl.
CPC ............. *H01B 7/295* (2013.01); *H01B 1/026* (2013.01); *H01B 7/28* (2013.01); *Y02A 30/14* (2018.01)

(58) Field of Classification Search
CPC ........... H01B 1/026; H01B 7/28; H01B 7/295
See application file for complete search history.

(56) References Cited

U.S. PATENT DOCUMENTS

| | | | | |
|---|---|---|---|---|
| 2,851,515 A * | 9/1958 | Kolmorgen | ............... | H01B 7/18 174/117 R |
| 3,773,505 A * | 11/1973 | Nesslage | ................... | C22C 9/00 420/492 |
| 4,402,489 A * | 9/1983 | Murray | ................. | B65H 57/12 182/230 |
| 4,671,896 A * | 6/1987 | Hasegawa | ................ | C08K 3/04 106/18.11 |
| 6,259,031 B1 * | 7/2001 | Totland | ................ | H01B 7/1895 174/110 R |
| 6,998,536 B2 | 2/2006 | Barusseau et al. | | |
| 7,799,998 B2 | 9/2010 | Alexander | | |
| 8,980,983 B2 | 3/2015 | La Ros et al. | | |
| 2004/0163839 A1 | 8/2004 | Dillon | | |
| 2005/0023029 A1 | 2/2005 | Mammeri et al. | | |
| 2007/0246240 A1 | 10/2007 | Alexander et al. | | |
| 2008/0124544 A1 | 5/2008 | Alexander et al. | | |
| 2013/0220667 A1 | 8/2013 | Millan Perez et al. | | |

FOREIGN PATENT DOCUMENTS

| | | |
|---|---|---|
| CA | 879 749 | 8/1971 |
| CA | 2 502 739 | 4/2004 |
| CA | 2 520 458 | 9/2005 |
| CA | 2 561 824 | 10/2005 |
| EP | 2 618 339 | 7/2013 |
| WO | 2010 142 917 | 12/2010 |
| WO | 2014 161 920 | 10/2014 |

* cited by examiner

*Primary Examiner* — William H. Mayo, III
*Assistant Examiner* — Krystal Robinson
(74) *Attorney, Agent, or Firm* — Emerson Thomson Bennett, LLC; Daniel A. Thomson

(57) ABSTRACT

An electric wire includes a metal conductor, a fire resistant polymer liner, and an insulation layer, wherein the insulation layer is over the liner.

17 Claims, 5 Drawing Sheets

UNCURED POLYMER WITH FILLERS → CURING → POLYMER WITH CHEMICAL CROSSLINKS

INSULATED WIRE CONSTRUCTION WITH LINER

This application claims priority to U.S. Ser. No. 62/158,809, entitled Insulated Wire Construction With Liner, filed May 8, 2015, the contents of which are incorporated herein by reference.

I. BACKGROUND

A. Field

The present teachings generally relate to methods and apparatuses for electrical wire, and more particularly to insulated wire for fire safety cable.

B. Background

Fire safety cable (critical circuit cable) finds application in providing electrical power to equipment and systems that are required to function during a fire. These systems may include fire alarm controllers, fire suppression equipment, sprinkler pumps in high rise buildings or other environments. This equipment needs to operate for a sufficient period of time to allow the safe evacuation of people the location of the fire.

Fire performance cables are required to continue to operate and provide circuit integrity when they are subjected to fire. To meet some of the standards, cables must typically maintain electrical circuit integrity when heated to a specified temperature (e.g. 650, 750, 950, 1050° C.) in a prescribed way for a specified time (e.g. 15 minutes, 30 minutes, 60 minutes, 2 hours). In some cases the cables are subjected to regular mechanical shocks, before, during and after the heating stage. Often they are also subjected to water jet or spray, either in the latter stages of the heating cycle or after the heating stage in order to gauge their performance against other factors likely to be experienced during a fire.

These requirements for fire performance cables have been met previously by wrapping the conductor of the cable with tape made with glass fibers and treated with mica. Such tapes are wrapped around the conductor during production and then at least one insulative layer is subsequently applied. Upon being exposed to increasing temperatures, the outer insulative layers are degraded and fall away, but the glass fibers hold the mica in place.

In the past the electrical power was provided through the use of mineral insulated cable. More recently, new and improved wire insulation material has been introduced for the safety cable (critical circuit) application. Today, a material of choice for wire insulation is a silicone rubber that has been specially formulated to form a ceramic-like layer when heated to the temperatures that are present in a fire.

The wire construction for safety cable (CI—"circuit integrity") is typically a copper conductor. Over the copper conductor is applied the ceramifiable silicon rubber insulation. A jacket material is applied over the silicone insulation to provide mechanical protection during installation. One safety cable (CI) requirement for this family of cables is a fire test where the cables are installed in a manufacturer's specified system, and then tested for functionality in a furnace that models petroleum-fueled fire. In one test protocol the furnace is programmed to subject the test samples to a temperature rise on ambient to 1010° C. over a period of 2 hours. During this test the cables are energized to the voltage appropriate to the cables specified application. One test used is UL 2196 for 2 hours. To meet the requirements of the UL2196 test, electrical functionality must be maintained throughout the 2 hours and the following simulated fire hose water spray test.

The UL2196 test method described in these requirements is intended to evaluate the fire resistive performance of electrical cables as measured by functionality during a period of fire exposure, and following exposure to a hose stream. To maintain the functionality of electrical cables during a fire exposure the cables are tested using a fire resistive barrier. The fire resistive barrier is the cable jacketing if the jacketing is designed to provide fire resistance. If the cable jacketing is not designed to provide fire resistance, the electrical cables are either placed within a fire resistive barrier or installed within an hourly rated fire resistive assembly. Fire resistive cables intended to be installed with a non-fire resistive barrier (such as conduit) are tested with the non-fire resistive barrier included as part of the test specimen. Otherwise fire resistive cables incorporating a fire resistive jacket are tested without any barrier. To demonstrate each cable's ability to function during the test, voltage and current are applied to the cable during the fire exposure portion of the test, and the electrical and visual performance of the cable is monitored. The cable is not energized during the hose spray, but it is visually inspected and electrically tested after the hose spray. The functionality during a fire exposure of non-fire resistive electrical cables which are intended for installation within fire barriers or for installation within hourly rated fire resistive assemblies is determined by tests conducted in accordance with the UL Outline of Investigation for Fire Tests for Electrical Circuit Protective Systems, Subject 1724. Two fire exposures are defined: a normal temperature rise fire and a rapid temperature rise fire. The normal temperature rise fire is intended to represent a fully developed interior building fire. The rapid temperature rise fire is intended to represent a hydrocarbon pool fire. Two hose stream exposures are defined: a normal impact hose stream and a low impact hose stream. The low impact hose stream is applied only to cable intended to contain the identifying suffix "CI" to identify it as CI cable in accordance with the Standard for Cables for Power-Limited Fire-Alarm Circuits, UL 1424, and in accordance with the Standard for Cables for Non-Power-Limited Fire-Alarm Circuits, UL 1425. In addition to fire alarm cables referenced in UL 1424 and UL1425, power cables can also be approved for CI (critical circuit) applications. These power cables must meet the performance requirements listed in UL 44. Type RHH, RHW2, RHW and others of this standard if able to pass UL2196 can be qualified for CI applications.

In addition to the UL 2196 test, the safety cable (CI) must also meet the electrical requirements for non-CI rated cable. One of the requirements for this family of cables is long term insulation resistance. For this test, a copper conductor, with only the silicone rubber used as insulation, is tested at the specified voltage while the cable is immersed in 90° C. water. The insulation resistance is monitored periodically. The decrease in resistance must level out at a value above the minimum required. One of the requirements is specified in UL 44. This compound can pass the requirements of UL 2196, but is marginal to unable to meet the requirements of UL 44 for insulation resistance long term in 90° C. water at rated voltage.

This UL44 test specifies the requirements for single-conductor and multiple-conductor thermoset-insulated wires and cables rated 600 V, 1000 V, 2000 V, and 5000 V, for use in accordance with the rules of the *Canadian Electrical Code (CEC), Part* 1, CSA C22.1, in Canada, *Standard for Electrical Installations*, NOM-001-SEDE, in Mexico, and the *National Electrical Code (NEC)*, NFPA-70, in the United States of America.

Uncured silicone rubber contains polymers of different chain lengths. It comprises a principal silicon-oxygen chain (the siloxane backbone) and an organic moiety bound to the silicon. A silicon atom has four valence electrons, which is why silicon rubber is often abbreviated with a Q for "quaternary group." The properties of silicone rubber vary greatly depending on the organic groups and the chemical structure. The organic groups may be methyl, vinyl, phenyl, or other groups. Depending on which organic groups are present, silicone polymers in common use are classified as follows: MQ, or polydimethylsiloxane (PDMS), denotes a polymer in which two methyl groups are bound to the siloxane backbone; VMQ stands for polydimethylsiloxane in which a small number of methyl groups have been replaced by vinyl groups; PVMQ stands for a VMQ in which a small number of methyl groups have been replaced by phenyl groups; and FVMQ stands for a VMQ in which a small number of methyl groups have been replaced by trifluoropropyl substituents.

Ceramifying polymer materials have been developed by incorporating ceramic forming pre-cursors into thermoplastics. These compounds can be processed on conventional plastic extrusion equipment to form sheets, profiles or coatings. In a fire situation, the polymer component is quickly pyrolized. However, a porous, coherent ceramic begins to form at sufficiently low temperatures to maintain the structural integrity of the material through to temperatures of over 1000° C. The ceramic forming systems can be adjusted to minimize dimensional changes, or to provide a degree of intumescence through entrapment of volatile gases from the polymer. This can produce a cellular structure with increased thermal resistance. Ceramifying polymer technology has already been commercialized for fire resistant cable coatings and shows promise for many other fire protection coating applications.

Ceramifying polymers generally consist of a polymer matrix with refractory silicate minerals which form the ceramic framework in combination with a flux system. This can allow a coherent ceramic structure to form at a relatively low temperature. Other functional additives may be added including stabilizers and flame retardants. A wide range of ceramifying polymers can be produced, including thermoplastics and emulsions suitable for coatings. Ceramification can be combined with intumescence through a mechanism which traps volatiles from the polymer decomposition as the ceramic structure is formed. This can produce a strong, cellular coating layer with good thermal resistance for fire protection applications.

Ceramifying polymers are not inherently flame retardant. However, they can be modified with organic or inorganic flame retardant systems to achieve low flammability ratings. Ceramification can also assist fire performance by producing a stable surface layer which insulates the underlying layers and may inhibit volatile emissions. This can delay ignition and reduce heat release rates.

Most polymers begin to decompose through oxidative reactions at temperatures of around 200° C. Higher performance polymers such as silicones persist to over 300° C. But typical fire tests require exposure to a temperature profile based on the combustion of a cellulose fuel load in a representative room. This reaches 700° C. in about 10 minutes at which all polymers, including silicones, rapidly decompose. The temperature continues to increase to 1000° C. after 1 hour. Hence, conventional polymers are generally unable to provide a barrier to fire, or thermal insulation, in systems which require a rating of 60 minutes or longer in these tests. These fire ratings are usually achieved by using intumescent materials, which produce an inorganic char with limited cohesive strength, or thick protective structures made from gypsum board or similar materials.

A characteristic of ceramifying polymers is their ability to form a self-supporting structure throughout the temperature range from ambient service temperature to over 1000° C. Reactions in the inorganic ceramic forming systems can commence from temperatures as low as 350° C. and continue to 800° C. or higher. This is achieved with fluxes which produce a controlled, low level of liquid phase at these temperatures. Ceramification in these materials is not simply the bonding or fusing of the silicate particles by a viscous liquid phase, such as with relatively high levels of low melting point glasses. Such materials tend to collapse at high temperatures and are not self-supporting. Ceramification involves reaction sintering assisted by the controlled level of liquid phase.

Solid silicone rubber contains polymers with a high molecular weight and relatively long polymer chains. Silicones are characterized by a fully saturated backbone of alternating silicon and oxygen atoms. The Si—O links in the chain have a bond energy of 451 kJ/mol. C—C links, by comparison, have a bond energy of 352 kJ/mol. The organic side groups shield the backbone.

Crosslinkers are typically utilized to convert the raw rubber into a mechanically stable cured product. Use is made of peroxide or platinum catalyst systems. Fillers are also used to reinforce the elastic silicone network. Peroxide curing involves the use of organic peroxides. At elevated temperatures, they decompose to form highly reactive radicals which chemically crosslink the polymer chains. The result is a highly elastic, three-dimensional network. During platinum-catalyzed addition curing, the crosslinker's Si—H groups react with the vinyl groups of the polymer to form a three-dimensional network.

II. SUMMARY

In accordance with one aspect of the present teachings, an electric wire includes an oxygen free high thermal conductivity conductor, a thermoplastic polymer liner, wherein the liner is a flame resistant polyethylene, wherein the liner is extruded on to the conductor, a first insulation layer, wherein the first layer is a non-ceramifiable silicone compound, a second insulation layer, wherein the second layer is a ceramifiable silicone compound, wherein the second layer is on the outside of the first layer, wherein the first and second layer are coextruded into inseparable layers, wherein the insulation layers surround the liner, a metal shield over the insulation layers, and a flame retardant polyethylene jacket over the metal shield.

In accordance with one aspect of the present teachings, an electric wire includes a metal conductor, a fire resistant polymer liner, and an insulation layer, wherein the insulation layer is over the liner.

In accordance with one aspect of the present teachings, the liner is extruded on to the conductor.

In accordance with one aspect of the present teachings, the liner is a low smoke zero halogen filled thermoplastic polyolefin, wherein the liner is less than about 0.01 inches thick, wherein the liner binds to the conductor.

In accordance with one aspect of the present teachings, the liner is a moisture barrier and has a non-stick surface.

In accordance with one aspect of the present teachings, the wire further includes a shield covering the insulation layer and a jacket covering the shield.

In accordance with one aspect of the present teachings, the jacket is flame retardant polymer.

In accordance with one aspect of the present teachings, the insulation layer is a first insulation layer and a second insulation layer, wherein the insulation layers are silicone.

In accordance with one aspect of the present teachings, the first and second layer are coextruded into inseparable layers.

In accordance with one aspect of the present teachings, the metal conductor is chosen from the group comprising stranded copper, stranded silver plated copper, stranded nickel plated copper, stranded nickel, solid copper, solid silver plated copper, tin plated copper, nickel alloy, solid nickel plated copper, and solid nickel, wherein the conductor has a cross sectional area between about 0.823 mm$^2$ and about 253.35 mm$^2$.

In accordance with one aspect of the present teachings, the liner and the insulation layer have a different phase change when exposed to temperatures at or above their respective phase change temperatures.

In accordance with one aspect of the present teachings, the insulation layer is silicone, wherein when the liner is exposed to temperatures at or above the ceramification temperature of silicone, the liner passivates on the conductor.

In accordance with one aspect of the present teachings, one of the first and second insulation layers is made of ceramifiable silicone and one of the first and second insulation layers is made of non-ceramifiable silicone.

In accordance with one aspect of the present teachings, both of the first and second insulation layers is made of ceramifiable silicone.

In accordance with one aspect of the present teachings, the passivated conductor is kept free of oxygen.

In accordance with one aspect of the present teachings, an electric wire includes a metal conductor, wherein the metal conductor is chosen from the group comprising stranded copper, stranded silver plated copper, stranded nickel plated copper, stranded nickel, solid copper, solid silver plated copper, tin plated copper, nickel alloy, solid nickel plated copper, and solid nickel, wherein the conductor has a cross sectional area between about 0.823 mm$^2$ and about 253.35 mm$^2$, wherein the first layer has an acceptable 90° C. wet insulation resistance performance, a thermoplastic polymer liner, wherein the liner is a flame resistant polyethylene, wherein the liner is extruded on to the conductor, a first insulation layer, wherein the first layer is a non-ceramifiable platinum-cured polydimethylsiloxane, wherein the first layer is between about 5 mils to about 12 mils, a second insulation layer, wherein the second layer is a ceramifiable peroxide-cured polydimethylsiloxane, wherein the second layer is on the outside of the first layer, wherein the second layer is about 35 mils, wherein the first and second layer are coextruded into inseparable layers, wherein the width of the layers is not greater than about 60 mils, and a thermoplastic, halogen free, fire-retardant, olefinic extruded jacket.

In accordance with one aspect of the present teachings, the first and second layers are coextruded into inseparable layers.

In accordance with one aspect of the present teachings, the non-ceramifiable layer has an acceptable 90° C. wet insulation resistance performance.

In accordance with one aspect of the present teachings, the first layer has a diameter of between about 10% to about 40% of the diameter of the combined first and second layers.

In accordance with one aspect of the present teachings, the thickness of the layers can be as low as about 15 mils.

In accordance with one aspect of the present teachings, the first layer is between about 2 mils and about 15 mils and the second layer is between about 15 mils and about 50 mils.

In accordance with one aspect of the present teachings, the first layer is between about 5 mils to about 12 mils and the second layer is about 35 mils.

In accordance with one aspect of the present teachings, the metal conductor is chosen from the group comprising stranded copper, stranded silver plated copper, stranded nickel plated copper, stranded nickel, solid copper, solid silver plated copper, tin plated copper, nickel alloy, solid nickel plated copper, and solid nickel, wherein the conductor has a cross sectional area between about 0.823 mm$^2$ and about 253.35 mm$^2$.

In accordance with one aspect of the present teachings, the first insulation layer is addition cured or peroxide cured.

In accordance with one aspect of the present teachings, the second insulation layer is addition cured or peroxide cured.

In accordance with one aspect of the present teachings, the wire has an extruded jacket over the first and second insulation layers.

In accordance with one aspect of the present teachings, the silicone compound is a polyorganosiloxane and is cross-linked with a peroxide compound or a curing agent.

In accordance with one aspect of the present teachings, the ceramifiable silicone compound is a polydimethylsiloxane and has a density of about 1.05 to about 1.60 g/cm$^3$, a Shore A hardness of about 3 to about 90, a tensile strength of about 5 to about 11 N/mm$^2$, an elongation at break of about 100% to about 1,100%, a tear strength of about 5 to about 55 N/mm, a compression set of about 5 to about 25%, and a rebound resilience of about 30% to about 70%.

In accordance with one aspect of the present teachings, the ceramifiable silicone compound is a polydimethylsiloxane and has a density of about 1.20 to about 1.29 g/cm$^3$, a Shore A hardness of about 70 to about 72, a tensile strength of about 6.6 to about 9 N/mm$^2$, an elongation at break of about 330% to about 430%, and a tear strength of about 18 to about 26 N/mm.

In accordance with one aspect of the present teachings, the non-ceramifiable silicone compound is a polyorganosiloxane.

In accordance with one aspect of the present teachings, the non-ceramifiable silicone compound is a polydimethylsiloxane.

Other benefits and advantages will become apparent to those skilled in the art to which it pertains upon reading and understanding of the following detailed specification.

III. BRIEF DESCRIPTION OF THE DRAWINGS

The present teachings are described hereinafter with reference to the accompanying drawings.

IV. DETAILED DESCRIPTION

Figure 1:
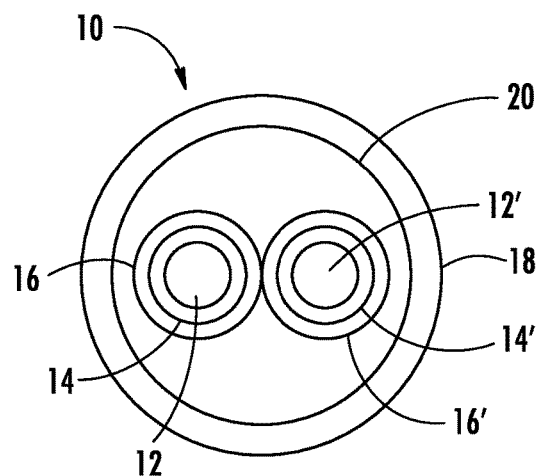
FIG. 1 shows a cross-sectional view of the wire.

In reference to the FIGS. 1-4, a wire 10 includes two conductors 12, 12', a liner 14, 14' for each conductor 12, 12', an insulation layer 16, 16' covering each liner 14, 14', a shield 20 around the insulation layers 16, 16', and an extruded jacket 18 around the shield 20. In one embodiment, the conductors 12, 12' are oxygen free high thermal conductivity (OFHC) metal conductors. OFHC copper is a group of wrought high conductivity copper alloys that have been electrolytically refined to reduce the level of oxygen to 0.001% or below. In this embodiment, the liners 14, 14' are extruded, thin wall layers, utilizing a fire resistant, LSZH ("low smoke zero halogen") filled thermoplastic polymer. The liners 14, 14' are extruded directly on to the conductors 12, 12'. In one embodiment, the liners 14, 14' provide a non-stick surface to the conductors 12, 12' and provide a moisture barrier in wet conditions. The moisture barrier allows the wire 10 to be useful in mass transit and tunnel applications. The liners 14, 14' could be a thermoplastic or thermoset polymer. With a typical silicone insulation layer, when subjected to the high temperatures of a fire, the silicone will turn into a gel, and then ceramify. When the silicone insulation layer 16, 16' ceramify, they crack and expose the conductors 12, 12', if the insulation layers 16, 16' were directly on the conductors 12, 12'. The liners 14, 14' when subjected to high temperatures, turn directly to ash, passivate on the conductors 12, 12' and form a powdery membrane that protects the conductors 12, 12', and keeps oxygen away from the conductors 12, 12'. The powdery membrane also allows the conductors 12, 12' to remain malleable, and prevents electrical leakage from the conductors 12, 12'. The shield 20 be made of metal or a metalized synthetic tape. The shield 20 can be copper, aluminum, steel, or an alloy. In one embodiment, the shield 20 is aluminum, as the aluminum tends to sacrifice faster than copper and other metals. The conductors 12, 12' in this embodiment can be chosen from the group comprising stranded copper, stranded silver plated copper, stranded nickel plated copper, stranded nickel, solid copper, solid silver plated copper, tin plated copper, nickel alloy, solid nickel plated copper, and solid nickel. The liners 14, 14' can be thermoplastic polymers, thermoset polymers, a mica wrap, a mica impregnated coating, or a fiberglass serve dipped in a mica solution. The liners 14, 14' can have a thickness of approximately 0.5 mil to approximately 30 mil (including, but not limited to, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5. 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, and 30.0). When a shield 20 is used, a drain wire (not shown) can be used to ground the shield. The drain wire will ground the wire 10, and draw away stray electrical build-up (static) that the wire 10 may be exposed to. This will reduce any signal degradation, as well provide a source for shorting out the electrical system. In embodiments where a metalized synthetic tape is used as the shield 20, the drain wire will be in contact with the metal side of shielding tape.

With continued reference to FIGS. 1-4, and the above embodiment, the insulation layer 16 can be a silicone rubber, which, alone, does not have acceptable long term insulation in 90° C. water. When the insulation layer 16 is made of silicone, the polymer liner 12 does not bind with the silicone of the insulation layer 16. However, some other methyl vinyl silicone compounds used in wire and cable applications are able to meet the insulation requirements in water at 90° C. It has been found that the silicone insulation over the liner 14 can be coextruded in two layers. The two layers (the first a non-ceramifiable silicone compound, and the second a ceramifiable silicone compound; the first a ceramifiable layer and the second a non-ceramifiable layer, or both layers being ceramifiable) are joined in their uncured state within the co-extrusion tooling (not shown). The layers are applied concentrically and are composed of two concentric layers. In one example, each layer is cured by peroxide curing or addition curing. When cured, the two layers cure together intimately and are inseparable and act as one insulation layer. The first layer is selected from the available wire and cable silicone insulating compounds that are not ceramifiable and have acceptable 90° C. wet insulation resistance performance. The second or outer layer is a ceramifiable compound. The percentage of the inner layer to the total insulation wall is from about 10% to about 40% (including, but not limited to, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40). A non-limiting example of the silicone compounds used for the layers 16 are non-ceramifiable polydimethylsiloxane and ceramifiable polydimethylsiloxane. In one embodiment, an aluminum shield 20, with aramid fiber backing surrounds the insulation layer 16. A suitable jacket 18, such as a thermoset material or thermoplastic, is extruded onto the shield 20. In one example, the jacket 18 is made of a fire resistant polyethylene, which can be MegoloniM provided by AlphaGary, Ltd. It is to be understood that the insulation layer 16 could also be one layer.

With continuing reference to FIGS. 1-4, the total width of the insulation layer 16 is at least about 15 mils. In one example, wherein the insulation layer 16 has two layers, the first layer has a width of about 2 to about 15 mils (including, but not limited to, 2, 3, 4, 5, 6, 7, 8, 9, 10, 11, 12, 13, 14, and 15) and the second layer has a width of about 15 to about 50 mils (including, but not limited to, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50). In another example, the first layer has a width of about 5 to about 12 mils (including, but not limited to, 5, 6, 7, 8, 9, 10, 11, and 12) and the second layer has a width of about 33 to about 35 mils (including, but not limited to, 33, 34, and 35). The conductor 12 can be a single conductor cable between 18 gauge AWG (cross-section area of 0.823 mm$^2$) and 500 MCM (cross-section area of 235.35 mm$^2$), and can be stranded or solid. In one example, the conductor is chosen from copper, silver plated copper, tin plated copper, nickel plated copper, nickel alloy, and nickel.

In one example, the ceramifiable silicone compound is a polydimethylsiloxane and has a density of about 1.05 to about 1.60 g/cm$^3$ (including, but not limited to, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, and 1.60), a Shore A hardness of about 3 to about 90 (including, but not limited to, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, and 90) a tensile strength of about 5 to about 11 N/mm² (including, but not limited to, 5, 6, 7, 8, 9, 10, and 11), an elongation at break of about 100% to about 1,100% (including, but not limited to, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, and 1100), a tear strength of about 5 to about 55 N/mm (including, but not limited to, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, and 55), a compression set of about 5 to about 25% (including, but not limited to, 5, 6, 7, 8, 9, 10, 11, 12, 13, 14, 15, 16, 17, 18, 19, 20, 21, 22, 23, 24, and 25), and a rebound resilience of about 30% to about 70% (including, but not limited to, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, and 70). In another example, the ceramifiable silicone compound is a polydimethylsiloxane and has a density of about 1.20 to about 1.29 g/cm³ (including, but not limited to, 1.20, 1.21, 1.22, 1.23, 1.24, 1.25, 1.26, 1.27, 1.28, and 1.29), a Shore A hardness of about 70 to about 72 (including, but not limited to, 70, 71, and 72), a tensile strength of about 6.6 to about 9 N/mm² (including, but not limited to, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, and 9.0), an elongation at break of about 330% to about 430% (including, but not limited to, 330, 340, 350, 360, 370, 380, 390, 400, 410, 420, and 430), and a tear strength of about 18 to about 26 N/mm (including, but not limited to, 18, 19, 20, 21, 22, 23, 24, 25, and 26).

Figure 5:
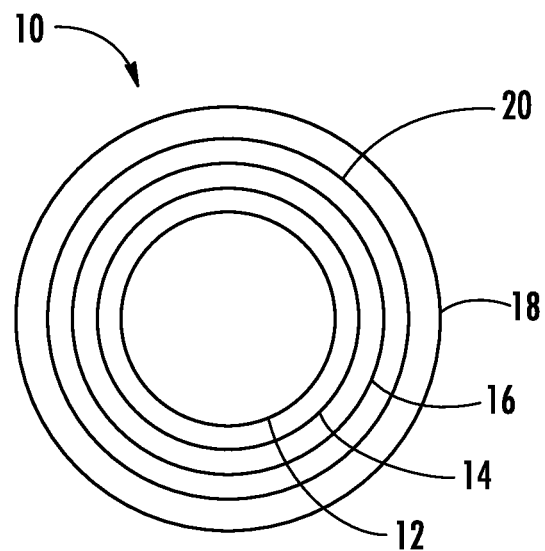
FIG. 5 shows a cross-sectional view of another embodiment of the wire.
Figure 6:
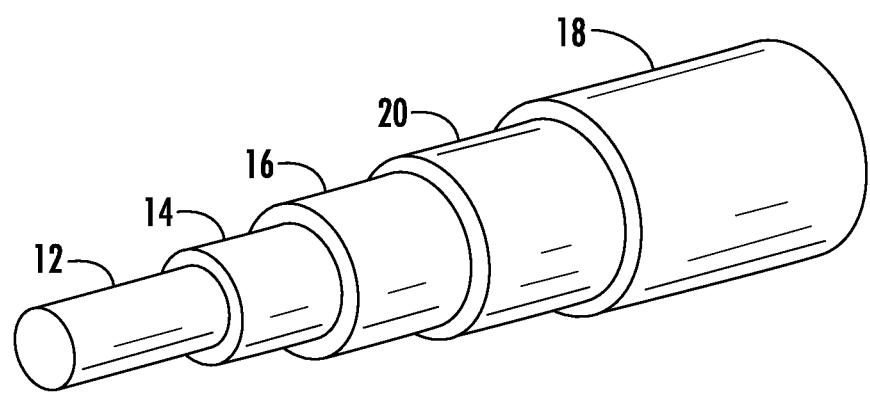
FIG. 6 shows a cut away perspective view of the wire of FIG. 5.

With reference now to FIGS. 5 and 6, the wire as described above has two conductors, which is typically used in low voltage applications (~300V or less), another embodiment utilizes only a single conductor 12. A wire 10 includes a conductor 12, a liner 14 over the conductor 12, an insulation layer 16 covering the liner 14, a shield 20 around the insulation layer 16, and an extruded jacket 18 around the shield 20. In one embodiment, the conductor 12 is an OFHC metal conductor. In this embodiment, the liner 14 is extruded, thin wall layers, utilizing a fire resistant, LSZH ("low smoke zero halogen") filled thermoplastic polymer. The liner 14 is extruded directly on to the conductor 12. In one embodiment, the liner 14 provides a non-stick surface to the conductor 12 and provides a moisture barrier in wet conditions. The moisture barrier allows the wire 10 to be useful in mass transit and tunnel applications. The liner 14 could be a thermoplastic or thermoset polymer. With a typical silicone insulation layer, when subjected to the high temperatures of a fire, the silicone will turn into a gel, and then ceramify. The liner 14, when subjected to high temperatures, turns directly to ash, passivated on the conductor 12 and forms a powdery membrane that protects the conductor 12, and keeps oxygen away from the conductor 12. The powdery membrane also allows the conductor 12 to remain malleable, and prevents electrical leakage from the conductors 12. The shield 20 be made of metal or a metalized synthetic tape. The shield 20 can be copper, aluminum, steel, or an alloy. In one embodiment, the shield 20 is aluminum, as the aluminum tends to sacrifice faster than copper and other metals. The shield 20 can have a synthetic backing, such as polyethylene or aramid fibers. The conductor 12 in this embodiment can be chosen from the group comprising stranded copper, stranded silver plated copper, stranded nickel plated copper, stranded nickel, solid copper, solid silver plated copper, tin plated copper, nickel alloy, solid nickel plated copper, and solid nickel. The liner 14 can be thermoplastic polymers, thermoset polymers, a mica wrap, a mica impregnated coating, or a fiberglass serve dipped in a mica solution. The liner 14 can have a thickness of approximately 0.5 mil to approximately 30 mil (including, but not limited to, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5. 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, and 30.0).

Figure 2:
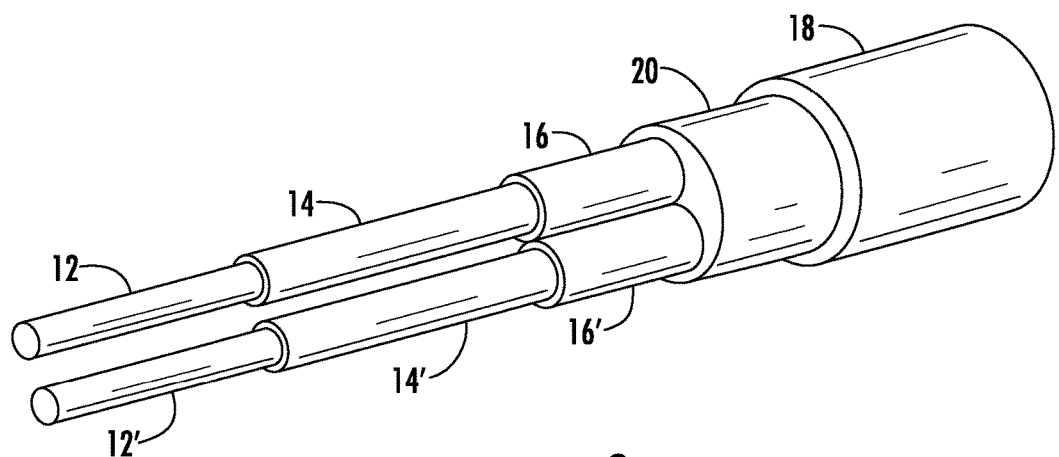
FIG. 2 shows a cut away perspective view of the wire.
Figure 3:
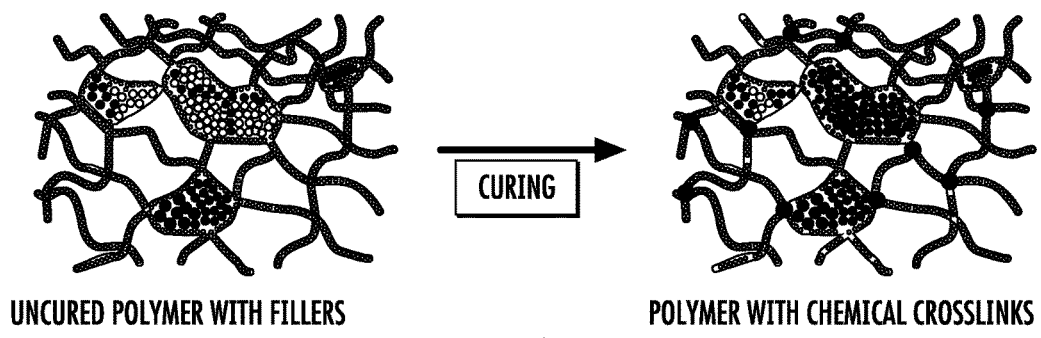
FIG. 3 shows the curing process.
Figure 4:
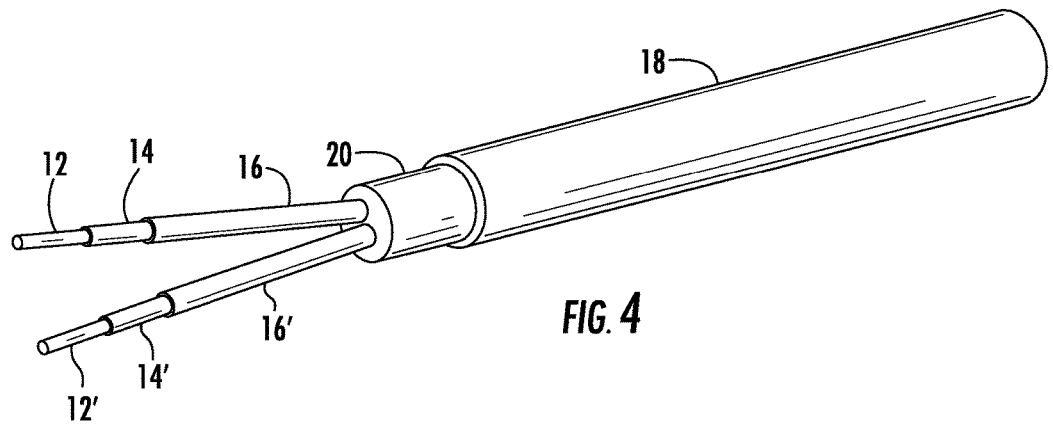
FIG. 4 shows a cut away perspective view of the wire.
Figure 7:
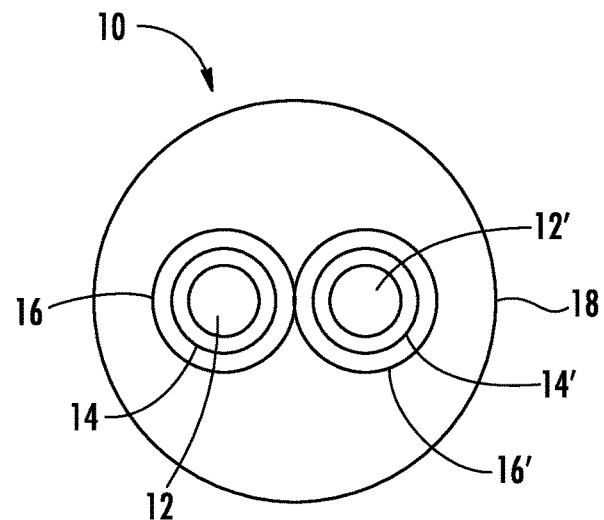
FIG. 7 shows a cross-sectional view of the wire without a shield.
Figure 8:
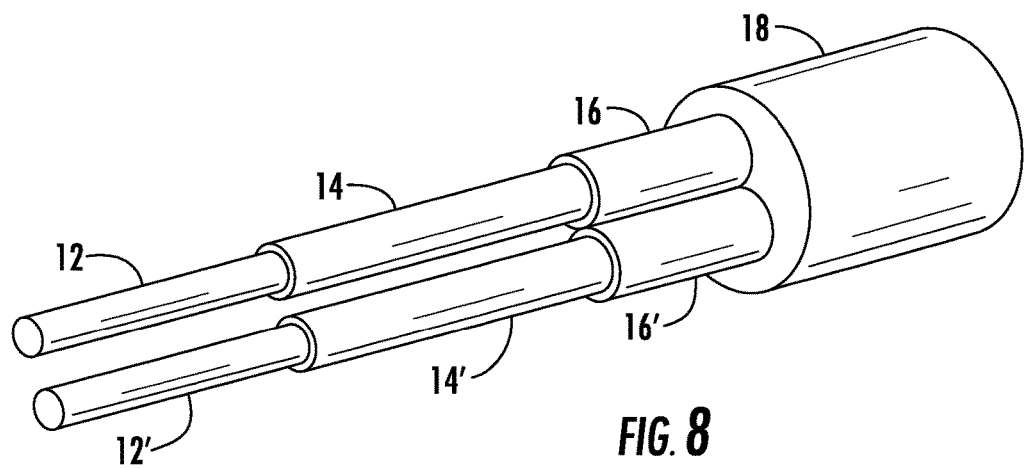
FIG. 8 shows a cut away perspective view of the wire of FIG. 7.
Figure 9:
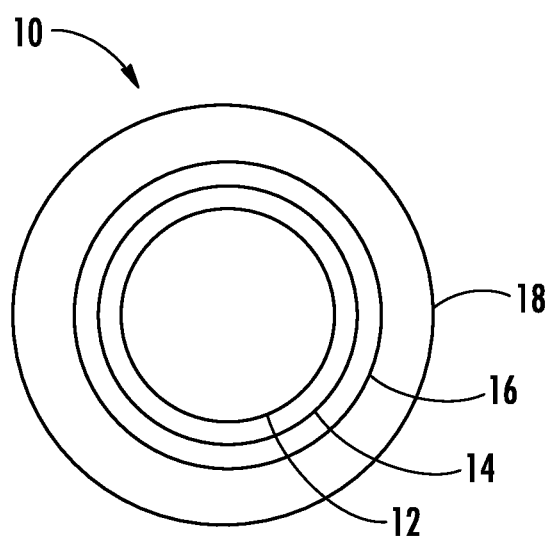
FIG. 9 shows a cross-sectional view of another embodiment of the wire without a shield; and, FIG. 10 shows a cut away perspective view of the wire of FIG. 9.
Figure 10:
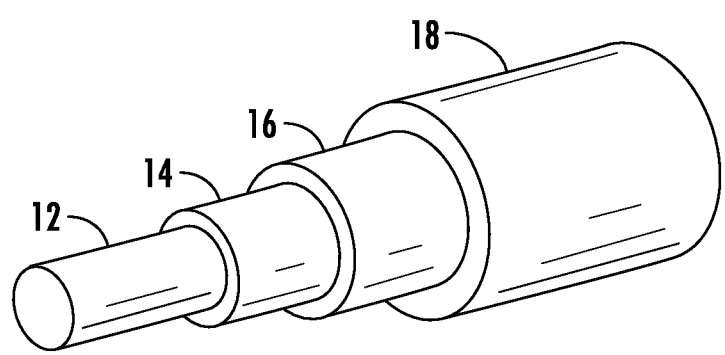

With reference now to FIGS. 7-10, a wire 10 is shown, which, for FIGS. 7 and 8 is identical to the wires of FIGS. 1 and 2, and for FIGS. 9 and 10 is identical to the wires of FIGS. 5 and 6, except that, in this embodiment, the wire 10 does not have a shield.

Example. In one example, the conductor is OFHC bare copper, with a diameter between 50 mils and 71 mils, a thermoplastic polyolefin liner extruded on to the conductor, with a thickness of 5 mils, a first insulation layer of silicone rubber, with a thickness of 10 mils, a second insulation layer of ceramifiable silicone rubber, with a thickness of 20 mils, a polyamide/aluminum shield, with a thickness of 3 mils, and a thermoplastic polyolefin jacket, with a diameter of 35 mils.

A UL 2196 test was run on a wire with two conductors, a polymer liner, an insulation layer, a shield, and a jacket. If leakage approaches 3000 mA, the fuse will likely blow. Generally, any time the leakage is above 1000 to 1500 mA, the possibility of circuit failure is high. During this test, which was conducted for two hours at temperatures up to 1850° F., the leakage rates for the wire at the two hour mark were between 2.00 mA and 29.35 mA, which is well below the 1000 mA failure threshold.

It is to be understood that the wire (using a key as follows: J=jacket; S=shield; $I^c$=ceramifiable insulating layer; $I''$=non-ceramifiable insulating layer; L=polymer liner; M=mica wrap liner; G=mica-impregnated liner; C=conductor) can be made in at least the following ways: $JSI^cLC$; $JI^cLC$; $JSI''$-$^cLC$; $JSI^cI''LC$; $JI^cI^cLC$; $JI^cI''LC$; $JSI''I^cLC$; $JI''I^cLC$; $JSI^cMC$; $JI^cMC$; $JSI^cI^cMC$; $JSI^cI''MC$; $JI^cI^cMC$; $JI^cI''MC$; $JSI''I^cMC$; $JI''I^cMC$; $JSI^cGC$; $JI^cGC$; $JSI^cI^cGC$; $JSI^cI''GC$; $JI^cI^cGC$; $JI^cI''GC$; $JSI''I^cGC$; and $JI''I^cGC$. With respect to $JSI^cLC$; $JI^cLC$; $JSI^cI^cLC$; $JSI^cI''LC$; $JI^cI^cLC$; $JI^cI''LC$; and $JSI''I^cLC$ the wire can either contain mica or be made without mica. With each of the above examples, the polymer liner can be extruded onto the conductor. In addition, when the insulating layer is two layers, the layers can be co-extruded onto the liner.

The embodiments have been described, hereinabove. It will be apparent to those skilled in the art that the above methods and apparatuses may incorporate changes and modifications without departing from the general scope of the present teachings. It is intended to include all such modifications and alterations insofar as they come within the scope of the appended claims or the equivalents thereof. Although the description above contains much specificity, this should not be construed as limiting the scope of the present teachings, but as merely providing illustrations of some of the embodiments of the present teachings. Various other embodiments and ramifications are possible within its scope.

Furthermore, notwithstanding that the numerical ranges and parameters setting forth the broad scope of the present teachings are approximations, the numerical values set forth in the specific examples are reported as precisely as possible. Any numerical value, however, inherently contain certain errors necessarily resulting from the standard deviation found in their respective testing measurements.

Clause 1—An electric wire comprising an oxygen free high thermal conductivity conductor, a thermoplastic polymer liner, wherein the liner is a flame resistant polyethylene, wherein the liner is extruded on to the conductor, a first insulation layer, wherein the first layer is a non-ceramifiable silicone compound, a second insulation layer, wherein the second layer is a ceramifiable silicone compound, wherein the second layer is on the outside of the first layer, wherein the first and second layer are coextruded into inseparable layers, wherein the insulation layers surround the liner, an aluminum shield over the insulation layers, and a flame retardant polyethylene jacket over the aluminum shield.

Clause 2—An electric wire comprising a metal conductor, a fire resistant polymer liner, and an insulation layer, wherein the insulation layer is over the liner.

Clause 3—The electric wire of clause 2, wherein the liner is extruded on to the conductor.

Clause 4—The electric wire of clauses 2 or 3, wherein the liner is a low smoke zero halogen filled thermoplastic polyolefin, wherein the liner is less than about 0.01 inches thick, wherein the liner binds to the conductor.

Clause 5—The electric wire of clauses 2-4, wherein the liner is a moisture barrier and has a non-stick surface.

Clause 6—The electric wire of clauses 2-5, wherein the wire further comprises a shield covering the insulation layer and a jacket covering the shield.

Clause 7—The electric wire of clause 6, wherein the jacket is flame retardant polymer.

Clause 8—The electric wire of clauses 2-7, wherein the insulation layer is a first insulation layer and a second insulation layer, wherein the insulation layers are silicone.

Clause 9—The wire of clauses 2-8, wherein the first and second layer are coextruded into inseparable layers.

Clause 10—The wire of clauses 2-9, wherein the metal conductor is chosen from the group comprising stranded copper, stranded silver plated copper, stranded nickel plated copper, stranded nickel, solid copper, solid silver plated copper, solid nickel plated copper, and solid nickel, wherein the conductor has a cross sectional area between about 0.823 mm$^2$ and about 253.35 mm$^2$.

Clause 11—The electric wire of clauses 2-10, wherein the liner and the insulation layer have a different phase change when exposed to temperatures at or above their respective phase change temperatures.

Clause 12—The electric wire of clauses 2-11, wherein the insulation layer is silicone, wherein when the liner is exposed to temperatures at or above the ceramification temperature of silicone, the liner passivates on the conductor.

Clause 13—The electric wire of clauses 8-12, wherein at least one of the first and second insulation layers is made of ceramifiable silicone.

Clause 14—The electric wire of clauses 2-13, wherein the passivated conductor is kept free of oxygen.

Clause 15—An electric wire comprising a metal conductor, wherein the metal conductor is chosen from the group comprising stranded copper, stranded silver plated copper, stranded nickel plated copper, stranded nickel, solid copper, solid silver plated copper, solid nickel plated copper, and solid nickel, wherein the conductor has a cross sectional area between about 0.823 mm$^2$ and about 253.35 mm$^2$, wherein the first layer has an acceptable 90° C. wet insulation resistance performance, a thermoplastic polymer liner, wherein the liner is a flame resistant polyethylene, wherein the liner is extruded on to the conductor, a first insulation layer, wherein the first layer is a non-ceramifiable platinum-cured polydimethylsiloxane, wherein the first layer is between about 10 mils to about 12 mils, a second insulation layer, wherein the second layer is a ceramifiable peroxide-cured polydimethylsiloxane, wherein the second layer is on the outside of the first layer, wherein the second layer is about 35 mils, wherein the first and second layer are coextruded into inseparable layers, wherein the width of the layers is not greater than about 45 mils, and a thermoplastic, halogen free, fire-retardant, olefinic extruded jacket.

What is claimed is:

1. An electric wire comprising:
   an oxygen free high thermal conductivity conductor;
   a thermoplastic polymer liner, wherein the liner is a flame resistant polyethylene, wherein the liner is extruded on to the conductor;
   a first insulation layer, wherein the first layer is a non-ceramifiable silicone compound;
   a second insulation layer, wherein the second layer is a ceramifiable silicone compound, wherein the second layer is on the outside of the first layer, Wherein the first and second layer are coextruded into inseparable layers, wherein the insulation layers surround the liner;
   an aluminum shield over the insulation layers; and,
   a flame retardant polyethylene jacket over the aluminum shield.

2. An electric wire comprising:
   a metal conductor;
   a fire resistant polymer liner, wherein the liner is extruded directly onto the conductor; and,
   an insulation layer, wherein the insulation layer is over liner, wherein the insulation layer is silicone, wherein when the liner is exposed to temperatures at or above the ceramification temperature of silicone, the liner passivates on the conductor, wherein the passivated conductor is kept free of oxygen.

3. The electric wire of claim 2, wherein the liner is a low smoke zero halogen tilled thermoplastic polyolefin, wherein the liner is less than about 0.01 inches thick, wherein the liner binds to the conductor.

4. The electric wire of claim 3, wherein the wire further comprises:
   a shield covering the insulation layer; and,
   a jacket covering the shield.

5. The electric wire of claim 4, wherein the jacket is flame retardant polymer.

6. The electric wire of claim 4, wherein the insulation layer is a first insulation layer and a second insulation layer, wherein the insulation layers are silicone.

7. The wire of claim 6, wherein the first and second layer are coextruded into inseparable layers.

8. The electric wire of claim 6, wherein at least one of the first and second insulation layers is made of ceramifiable silicone.

9. The electric wire of claim 2, wherein the liner is a moisture barrier and has a non-stick surface.

10. The wire of claim 2, wherein the metal conductor is chosen from the group comprising stranded copper, stranded silver plated copper, stranded nickel plated copper, stranded nickel, solid copper, solid silver plated copper, solid nickel plated copper, and solid nickel, wherein the conductor has a cross sectional area between about 0.823 mm$^2$ and about 253.35 mm$^2$.

11. The electric wire of claim 2, wherein the liner and the insulation layer have a different phase change when exposed to temperatures at or above their respective phase change temperatures.

12. An electric wire comprising:
- a metal conductor, wherein the metal conductor is chosen from the group comprising stranded copper, stranded silver plated copper, stranded nickel plated copper, stranded nickel, solid copper, solid silver plated copper, solid nickel plated copper, and solid nickel, wherein the conductor has a cross sectional area between about 0.823 mm$^2$ and about 253.35 mm$^2$, wherein the first layer has an acceptable 90° C. wet insulation resistance performance;
- a thermoplastic polymer liner, wherein the liner is a flame resistant polyethylene, wherein the liner is extruded on to the conductor;
- a first insulation layer, wherein the first layer is a non-ceramifiable platinum-cured polydimethylsiloxane, wherein the first layer is between about 10 mils to about 12 mils;
- a second insulation layer, wherein the second layer is a ceramifiable peroxide-cured polydimethylsiloxane, wherein the second layer is on the outside of the first layer, wherein the second layer is about 35 mils, wherein the first and second layer are coextruded into inseparable layers, wherein the width of the layers is not greater than about 45 mils; and,
- a thermoplastic, halogen free, fire-retardant, olefinic extruded jacket.

13. An electric wire comprising:
- a metal conductor;
- a fire resistant polymer liner; and,
- an insulation layer, wherein the insulation layer is over the liner, wherein the insulation layer is silicone, wherein when the liner is exposed to temperatures at or above the ceramification temperature of silicone, the liner passivates on the conductor, wherein the passivated conductor is kept free of oxygen.

14. The electric wire of claim 13, wherein the liner is extruded on to the conductor.

15. The electric wire of claim 14, wherein the liner is a low smoke zero halogen filled thermoplastic polyolefin, wherein the liner is less than about 0.01 inches thick, wherein the liner binds to the conductor.

16. The electric wire of claim 15, wherein the wire further comprises:
- a shield covering the insulation layer; and,
- a jacket covering the shield.

17. The electric wire of claim 16, wherein the insulation layer is a first insulation layer and a second insulation layer, wherein the insulation layers are silicone, wherein the first and second layer are coextruded into inseparable layers.

* * * * *